United States Patent [19]
Gautier et al.

[11] Patent Number: 5,826,484
[45] Date of Patent: Oct. 27, 1998

[54] BOOSTER EQUIPPED WITH AN ADAPTIVE-FLOWRATE DIRECT AIR INLET

[75] Inventors: Jean Pierre Gautier; Ulysse Verbo, both of Aulnay-Sous-Bois, France

[73] Assignee: Bosch Systems de Freinage, Drancy, France

[21] Appl. No.: 596,351
[22] PCT Filed: Feb. 22, 1996
[86] PCT No.: PCT/FR96/00281
   § 371 Date: Mar. 8, 1996
   § 102(e) Date: Mar. 8, 1996
[87] PCT Pub. No.: WO96/29220
   PCT Pub. Date: Sep. 26, 1996

[30] Foreign Application Priority Data
Mar. 17, 1995 [FR] France ................ 95 03099

[51] Int. Cl.⁶ .................................. F15B 9/10
[52] U.S. Cl. ......................................... 91/376 R
[58] Field of Search .................. 91/28, 376 R; 60/453

[56] References Cited

U.S. PATENT DOCUMENTS 3,362,298 1/1968 Julow ................................. 91/376 R
4,632,014 12/1986 Endo ................................. 91/376 R
5,090,294 2/1992 Endou ................................ 91/376 R

*Primary Examiner*—F. Daniel Lopez
*Attorney, Agent, or Firm*—Leo H. McCormick, Jr.

[57] ABSTRACT

The invention relates to a pneumatic brake booster using two sources of air pressure and comprising a rigid casing (3) divided by a leaktight moving partition (4) into at least two chambers (3a, 3b), it being possible for the moving partition to be urged by a difference, brought about by an actuation of the valve, between the pressures supplied to the chambers in order to drive along a pneumatic piston (5) bearing an operating valve (7), the inside (50) of this piston being separated from the second source by a purification filter (14). The booster of the invention includes shut-off means (16, 51) with controlled opening, installed between the second source of pressure (A) and the inside (50) of the piston and controlling an air intake path (15) which connects the second chamber (3b) to the second source of pressure (A) avoiding passing through the filter (14) and the valve (7), and elastic means (17) which are sensitive to a difference in pressure between the inside of the piston and the second source of pressure, in order to allow selectively the opening of the shut-off means when this pressure difference exceeds a given threshold.

4 Claims, 4 Drawing Sheets

FIG:2

BOOSTER EQUIPPED WITH AN ADAPTIVE-FLOWRATE DIRECT AIR INLET

The present invention relates to a pneumatic brake booster using first and second sources of air pressure delivering first and second respective and different pressures, this booster comprising a rigid casing divided by at least one leaktight moving partition into at least two chambers, the first of which is connected to the first source, and the second of which can be connected selectively, by means of a valve, to either one of the two sources, it being possible for the moving partition to be urged by a difference in pressure brought about by an actuation of the valve, between the pressures supplied to the chambers, in order to drive along an at least partially cylindrical pneumatic piston sliding in leaktight fashion in the casing and bearing the valve, the inside of this piston and especially the valve being separated from the second source by a purification filter.

Devices of this type, well known in the prior art, are used on a very great number of motor vehicles nowadays.

Despite the traditional nature of the techniques involved, boosters continue to form the subject of substantial research, aiming to optimize their operating characteristics.

Among this research feature especially attempts to reduce both the level of noise of boosters in operation and their response time following actuation, the simultaneous reduction in these two parameters being made tricky by the fact that a booster is all the quieter if the air it lets into the rear chamber is filtered to a greater extent, while it has a response time which is all the shorter if the air it lets in is filtered to a lesser extent.

Moreover, as statistical studies have shown that collisions between vehicles could be avoided in a not insignificant proportion by less hesitant braking on the part of the drivers, the design of current braking systems tends to recognize the need to remedy the effects of any hesitation of the driver at the time of braking.

The invention falls within this context, and its object is to provide a booster which meets the expectations of the public as regards reduction in the level of noise in operation, while offering a response time which is at least as satisfactory as those of boosters of the prior art, in all cases where the need for a short response time is felt, and while offering increased braking safety.

To this end, the booster of the invention is essentially characterized in that it further includes at least one first air intake path formed by a passage which causes the second chamber to communicate with the second source of pressure, avoiding passing through the filter and the valve; shut-off means with selective opening installed on the first air intake path between the second source of pressure and the inside of the piston; and elastic means which are sensitive to a drop in pressure between the inside of the piston and the second source of pressure in order to allow selectively the opening of the shut-off means when this drop in pressure exceeds a given threshold.

According to a possible alternative embodiment, the booster of the invention may further include a second air intake path formed by a passage which causes the second chamber to communicate selectively with the second source of pressure, avoiding passing through the valve, it being possible for this second air intake path itself permanently to pass through the valve and include a section common to the first and second air intake paths, in which section the shut-off means with selective opening are installed.

In the usual case in which the valve is operated by an operating rod, the booster of the invention is preferably designed so that the filter adopts the shape of a cylinder fitted around the operating rod, and so that the shut-off means comprise a valve seat formed at the internal periphery of the piston and a flexible annular seal closing off a gap between the filter and the valve seat, bearing on the latter, and so that the elastic means comprise a spring pressing the seal onto the valve seat, against a force which can be exerted on this seal by the difference in pressure between the inside of the piston and the second source of pressure.

Other features and advantages of the invention will emerge clearly from the description thereof which is given hereafter by way of non-limiting indication with reference to the appended drawings in which.

Figure 1:
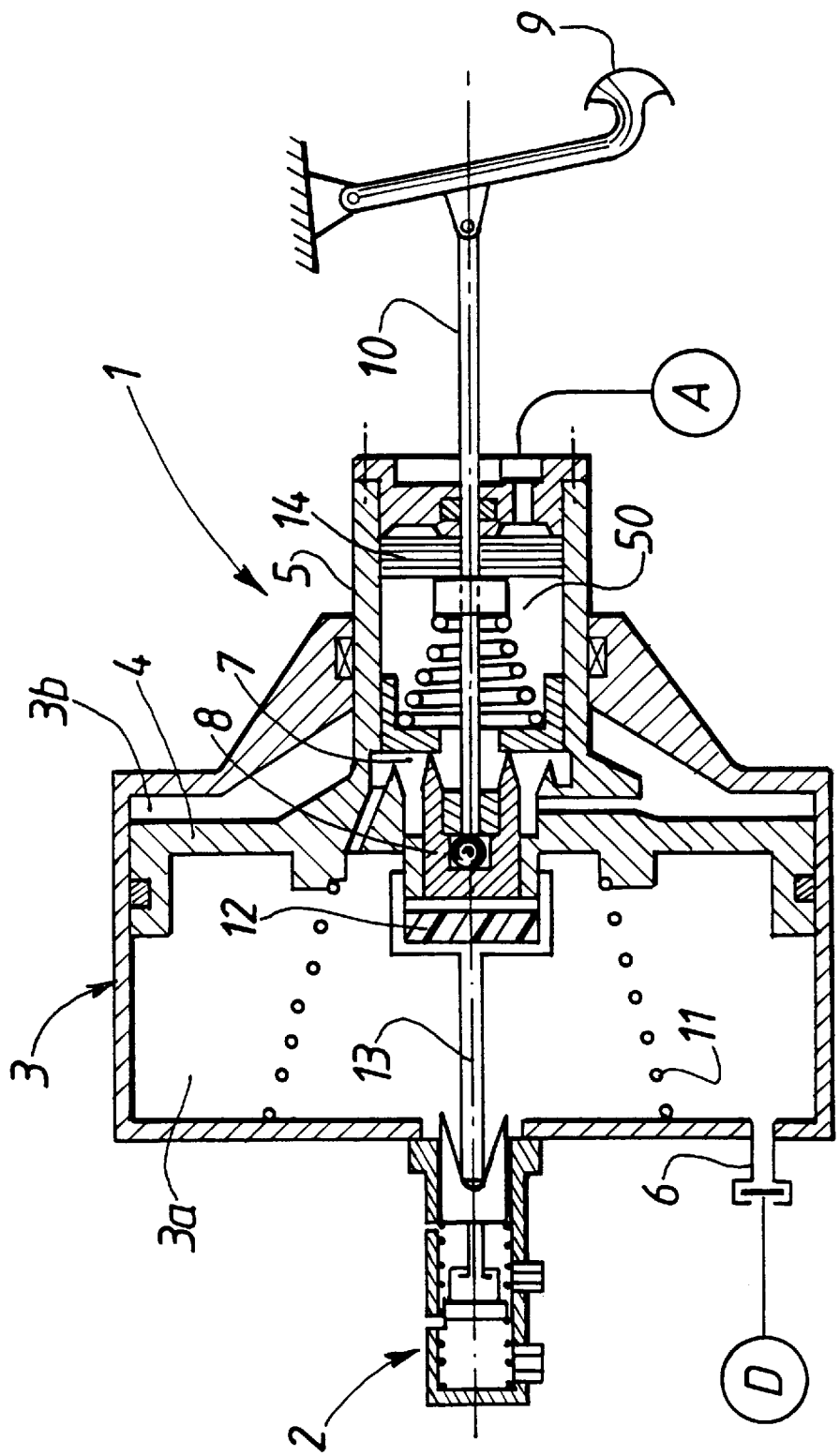
FIG. 1 is a diagrammatic sectional view of a pneumatically boosted braking system using a conventional booster.

Insofar as the invention relates merely to an improvement made to pneumatically boosted braking systems and as the general construction and operation of the latter are well known to the person skilled in the art, these systems will merely be recalled briefly here to give total understanding of the improvement that the invention represents.

Roughly, a system of this type comprises a booster 1 and a master cylinder 2.

The booster itself comprises a rigid casing 3 divided into two chambers 3a and 3b in leaktight fashion and by a moving partition 4 which can drive along a pneumatic piston 5, this being at least partially cylindrical and movable relative to the casing 3.

The front chamber 3a, the front face of which is closed in leaktight fashion by the master cylinder 2, is permanently connected to a source of low pressure D through a non-return valve 6.

The rear chamber 3b in contrast can be connected selectively either to the source of low pressure D, or to a source of high pressure, for example the atmosphere A.

To this end, access to the rear chamber 3b is controlled by a valve 7 and a plunger 8 which are housed in the piston 5, the plunger being connected to a brake pedal 9 via an operating rod 10 [sic].

When the operating rod 10 is in a position of rest, in this case pulled to the right, the valve 7 normally establishes a communication between the two chambers 3a and 3b of the booster.

As the rear chamber 3b is then subjected to the same partial vacuum as the front chamber 3a, the piston 5 is pushed back to the right, to the position of rest, by a return spring 11.

Actuation of the plunger 8 through a movement of the operating rod 10 (to the left in the figures) has the effect firstly of shifting the valve 7 so that it isolates the chambers 3a and 3b from one another then, secondly, of shifting this valve so that it opens the rear chamber 3b to atmospheric pressure A.

The pressure difference between the two chambers, then felt by the moving partition 4, exerts on the latter a thrust which tends to shift it to the left and allow it to drive along the piston 5 which in turn shifts, compressing the spring 11.

The braking force exerted on the plunger 8 by the operating rod 10, or "input force", and the brake boosting force, or "boost force", resulting from the thrust of the moving partition 4, combine on a reaction disk 12 to form an actuating force transmitted to the master cylinder via a thrust rod 13.

As FIG. 1 shows, the booster conventionally comprises a purifying filter 14, intended to prevent any contamination, by the atmosphere A, of the inside 50 of the pneumatic piston, of the valve 7, and of the rear chamber 3b.

Although such a filter is necessary at least to attenuate the operating noise of the booster, it slows down the airflow which the latter can use, and degrades the response time of the booster in a way which is all the more sensitive, the greater the acoustic insulation.

Not only does the booster of the invention overcome this problem, but it even makes it possible to benefit from the presence of the filter in order to increase the braking safety.

To this end, the booster of the invention includes, in addition to the members described previously (FIGS. 2 to 4), at least one first air intake path 15 formed by a passage 15a, 15b, 15c which causes the second chamber 3b to communicate with the second source of pressure A, avoiding passing through the filter 14 and the valve 7; shut-off means 16, 51 with selective opening, installed on the first air intake path 15 between the second source of pressure A and the inside 50 of the piston; and elastic means 17 which are sensitive to a drop in pressure between the inside 50 of the piston and the second source of pressure A, to allow selectively the opening of the shut-off means 16 when this drop in pressure exceeds a given threshold.

Figure 2:
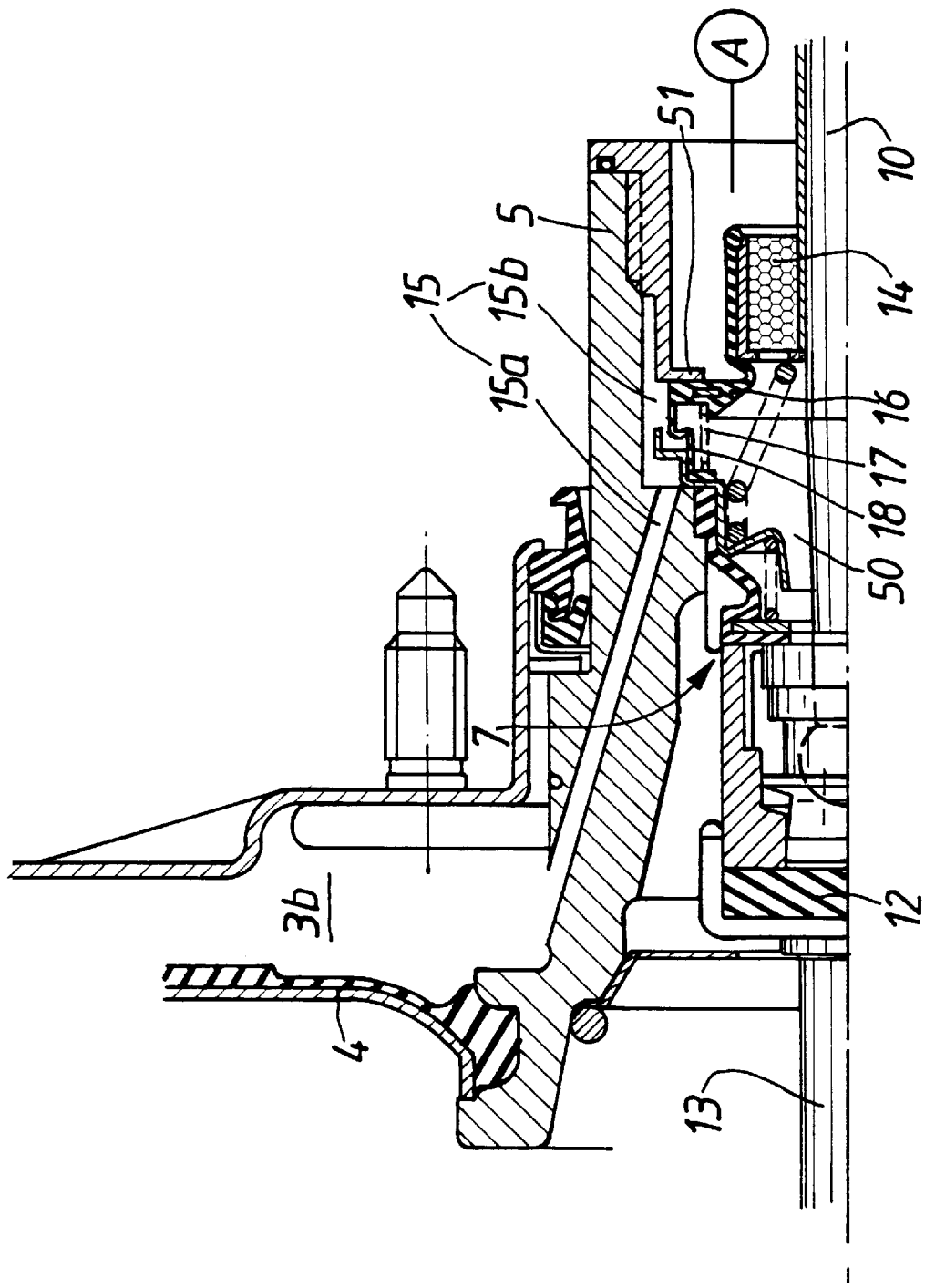
FIG. 2 is a part sectional view of a booster in accordance with a first embodiment of the invention.
Figure 3:
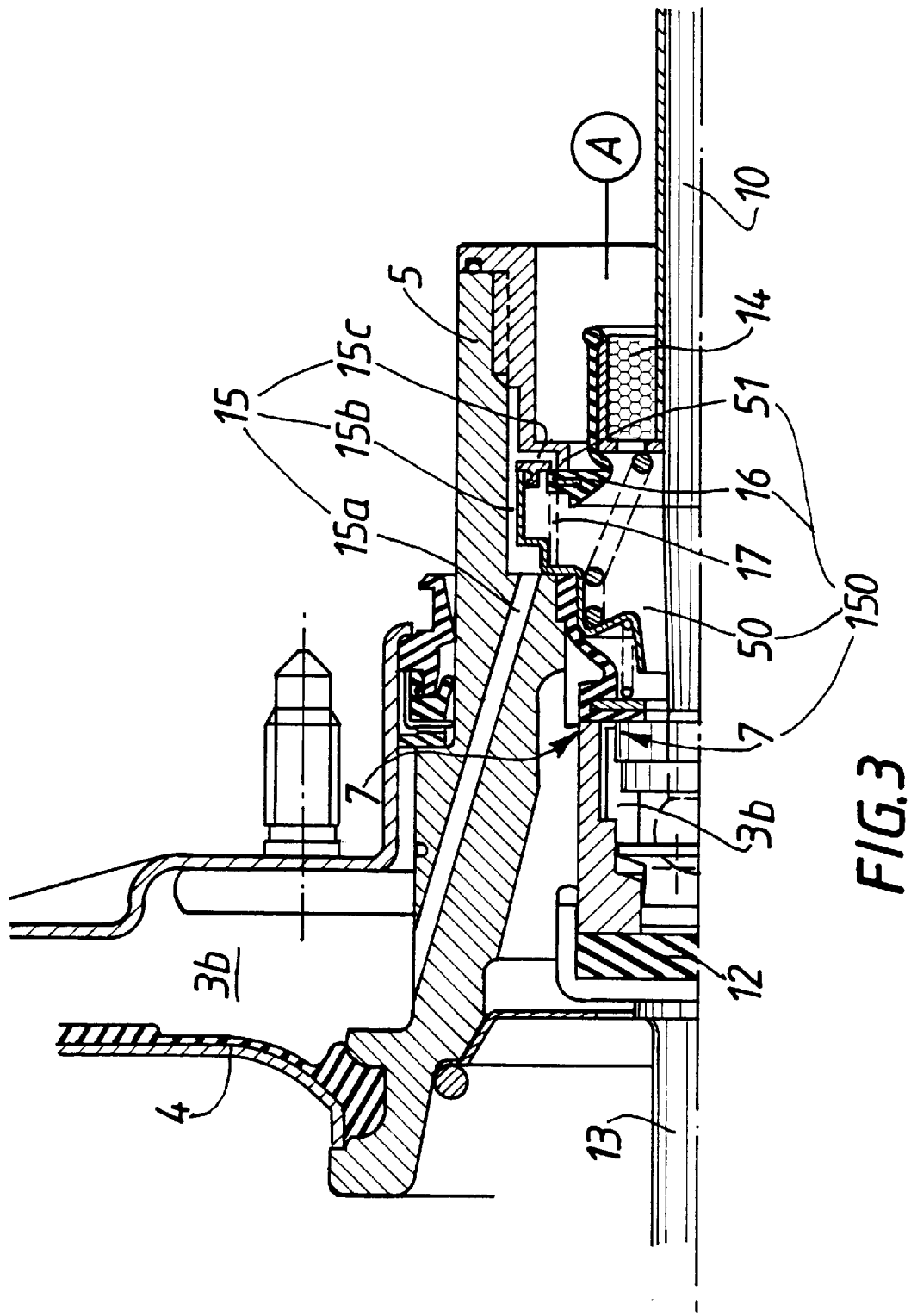
FIG. 3 is a part sectional view of a booster in accordance with a second embodiment of the invention.
Figure 4:
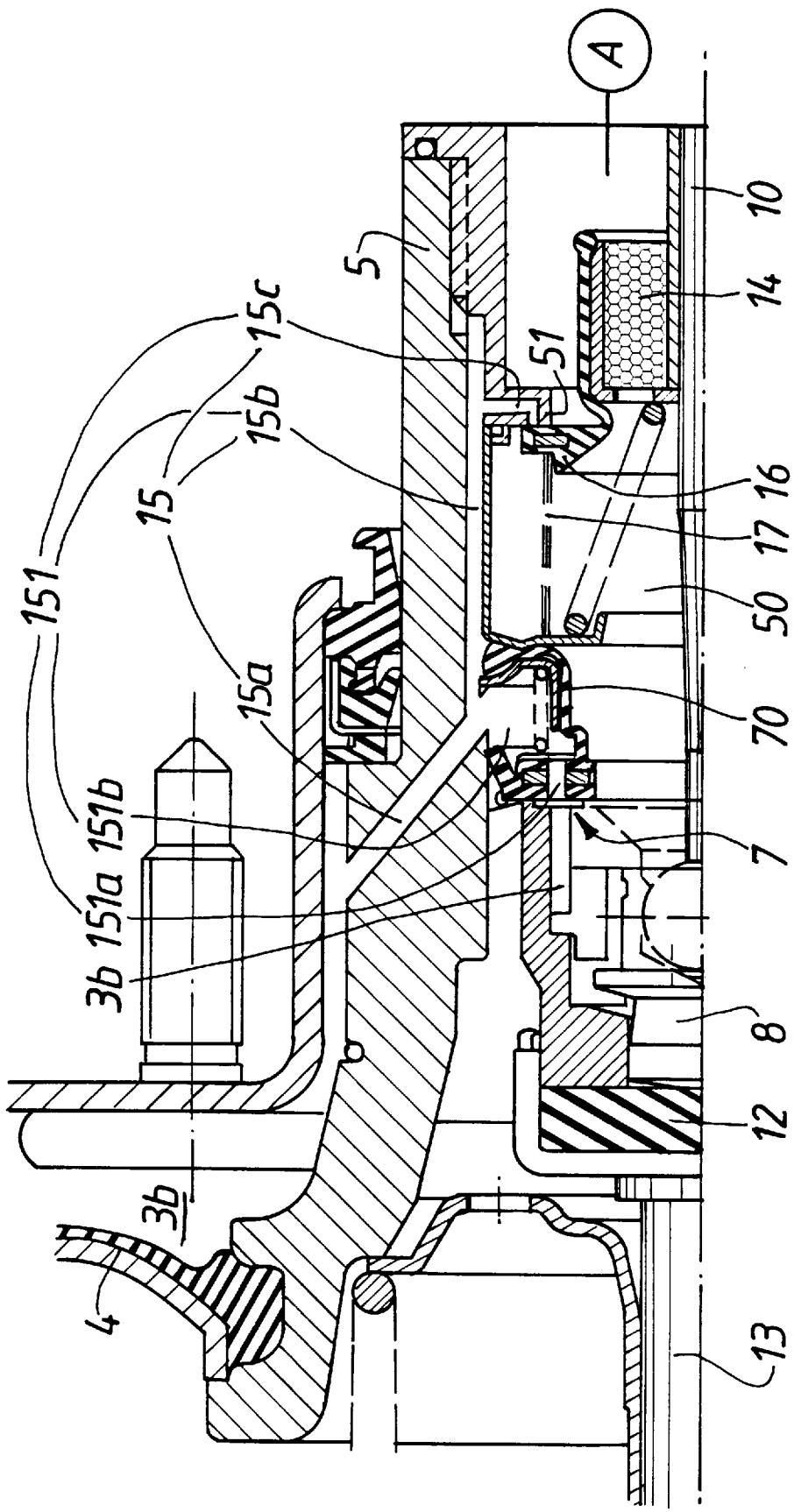
FIG. 4 is a part sectional view of a booster in accordance with a third embodiment of the invention.

For example, as FIGS. 2 to 4 show, the filter 14 may adopt the shape of a cylinder fitted around the operating rod 10, the shut-off means then preferably comprising a valve seat 51 formed at the internal periphery of the piston and a flexible annular seal 16 closing off a gap between the filter 14 and the valve seat 51, bearing on the latter, and the elastic means comprising a spring 17 pressing the seal 16 onto the valve seat 51, against a force which may be exerted on this seal by the difference in pressure between the inside 50 of the piston and the second source of pressure A.

According to a first possible embodiment (FIG. 2), the pneumatic booster of the invention may include, in addition to that which a conventional booster includes, only the first, direct air intake path 15, the valve 7 being isolated from this path 15 by one or more tubular members forming a continuous wall 18.

According to a second possible embodiment (FIG. 3), the pneumatic booster of the invention may, in contrast, include, in addition to the first air intake path 15, a second air intake path 150 formed by a passage which comprises the valve 7 when it is open, the inside 50 of the piston 5 and the gap between the seal 16 and the valve seat 51 when it is open, this second path 150 thus selectively causing the second chamber 3b to communicate with the second source of pressure A through the valve 7, avoiding passing through the filter 14.

Finally, according to a third possible embodiment (FIG. 4), the pneumatic booster of the invention may be equipped with a valve 7, known per se, the tubular member 70 of which is pierced with an orifice 151a permanently causing the external volume 151b of the tubular member 70 to communicate with the rear chamber 3b. This booster may thus include, in addition to the first air intake path 15, a second air intake path 151 formed by a passage 151a, 151b, 15b, 15c which selectively causes the second chamber 3b to communicate with the second source of pressure A, permanently passing through the valve 7 and avoiding passing through the filter 14, this second path 151 including a section 15b, 15c which is common to the first and second air intake paths and on which the shut-off means 16, 51 with selective opening are installed.

The operation of the booster of the invention is as follows.

When the booster is actuated abruptly, the suction force exerted by the source of partial vacuum D on the moving partition 4 brings about inside 50 the piston 5, a substantial instantaneous drop in pressure which, moreover, is all the greater, the higher the resistance of the filter 14 to the passage of air.

In these conditions, the flexible seal 16, the two faces of which are subjected to different pressures, is subjected to a force which, if greater than the force exerted by the spring 17, lifts the periphery of the seal 16 off the seat 51 against the force exerted by this spring and thus opens the first air communication path 15 as well as second the air communication path such as 150, 151, when one exists [sic].

If, in contrast, the booster is actuated progressively, the difference in pressure between the inside 50 of the booster and the second source A remains modest and the force to which the flexible seal 16 is subjected is insufficient to overcome the force exerted by the spring 17 on this seal, pressing it against the seat 51.

As the person skilled in the art will easily understand, these provisions make it possible to optimize the response time and level of noise of the booster in operation, while making it possible to obtain a minimum response time in emergency braking situations which require such a response time and in which the comfort of a low noise level is of no importance, and while reducing the level of noise in situations in which an increase in response time due to the air passing through the filter is accompanied by no consequence, in which situations the actuation of the booster is in any case too slow to be able to benefit from a very short response time.

Furthermore, any rapid actuation of the brake pedal leads to additional direct air inlet into the rear chamber 3b through the first communication path 15, and therefore brings about an automatic increase in the boosting to the braking, which is manifested by an initial increase in the braking force, regardless of the subsequent will displayed by the driver to reduce this braking force.

We claim:

1. Pneumatic brake booster using first and second sources of air pressure (D, A) delivering first and second respective and different pressures, this booster comprising a rigid casing (3) divided by at least one leaktight moving partition (4) into at least two chambers (3a, 3b), the first (3a) of which is connected to the first source (D), and the second (3b) of which can be connected selectively, by means of a valve (7), to either one of the two sources (D, A), it being possible for the moving partition to be urged by a difference in pressure brought about by an actuation of the valve, between the pressures supplied to the chambers, in order to drive along an at least partially cylindrical pneumatic piston (5) sliding in leaktight fashion in the casing and bearing the valve (7), the inside of this piston and the valve (7) being separated from the second source by a purification filter (14), characterized in that it further includes at least one first air intake path (15) formed by a passage (15a, 15b, 15c) which causes the second chamber (3b) to communicate with the second source of pressure (A), avoiding passing through the filter (14) and the valve (7); shut-off means (16, 51) with selective opening installed on the first air intake path (15) between the second source of pressure (A) and the inside (50) of the piston; and elastic means (17) which are sensitive to a drop in pressure between the inside (50) of the piston and the second source of pressure (A) in order to allow selectively the opening of the shut-off means (16, 51) when this drop in pressure exceeds a given threshold.

2. Pneumatic booster according to claim 1, characterized in that it further includes a second air intake path (150, 151)

formed by a passage (7, 50, 16–51) which causes the second chamber (3b) to communicate selectively with the second source of pressure (A) through the valve (7), avoiding passing through the filter (14).

3. Pneumatic booster according to claim 2, characterized in that the second air intake path (151) permanently passes through the valve (7) and includes a section (15b, 15c) common to the first and second air intake paths (15, 151), the shut-off means (16, 51) with selective opening being installed on the common section (15b, 15c).

4. Pneumatic booster according to any one of the preceding claims, in which the valve is operated by an operating rod (10), characterized in that the filter (14) adopts the shape of a cylinder fitted around the operating rod, and in that the shut-off means comprise a valve seat (51) formed at the internal periphery of the piston (5) and a flexible annular seal (16) closing off a gap between the filter (14) and the valve seat (51), bearing on the latter, and in that the elastic means comprise a spring (17) pressing the seal onto the valve seat, against a force which can be exerted on this seal by the difference in pressure between the inside of the piston and the second source of pressure.

* * * * *